H. G. KNODERER AND C. R. HUBBARD.
ELECTRICAL CONDUIT INSTALLATION.
APPLICATION FILED OCT. 3, 1917.
1,302,811.
Patented May 6, 1919.
2 SHEETS—SHEET 1.
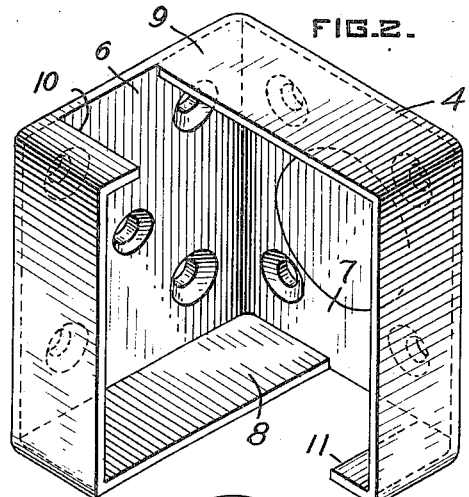
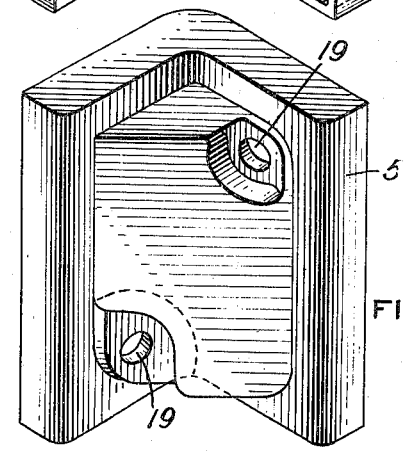
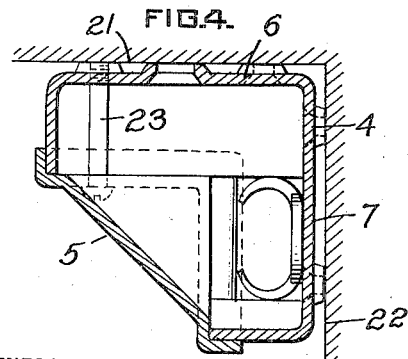
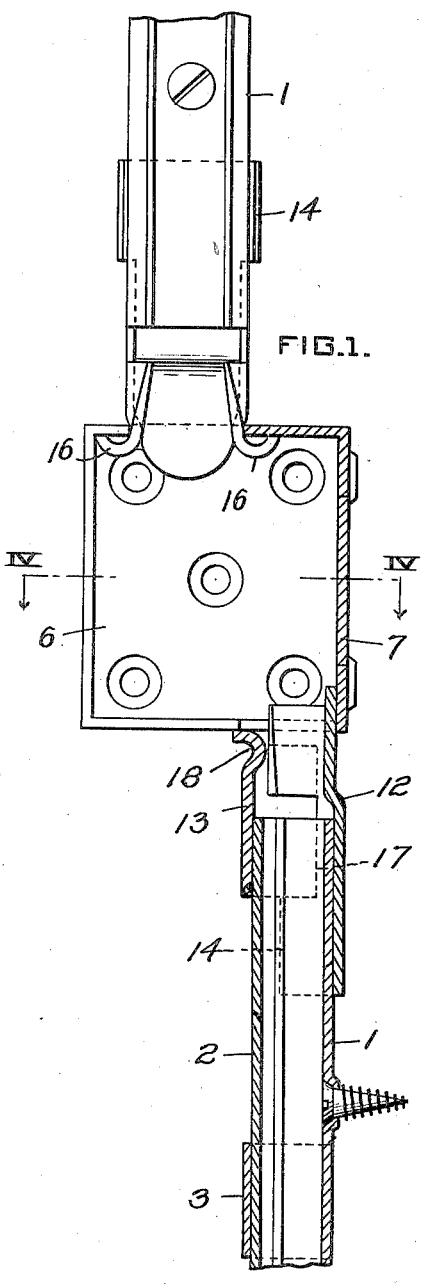
WITNESSES
J. Herbert Bradley.
Francis J. Tomasson.
INVENTOR
Homer G. Knoderer and
Cecil R. Hubbard
by Christy and Christy
their Attorneys

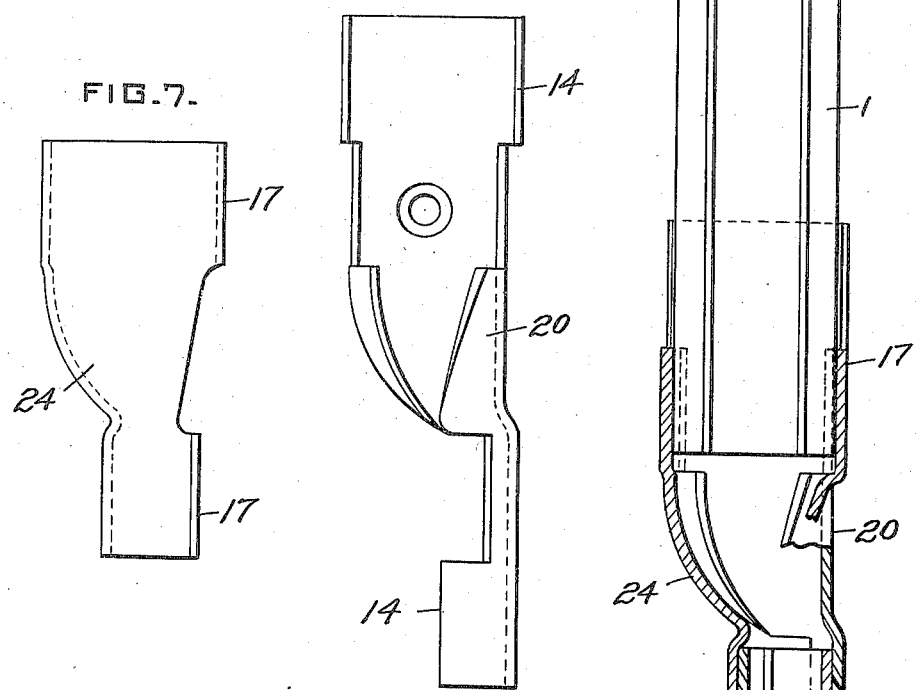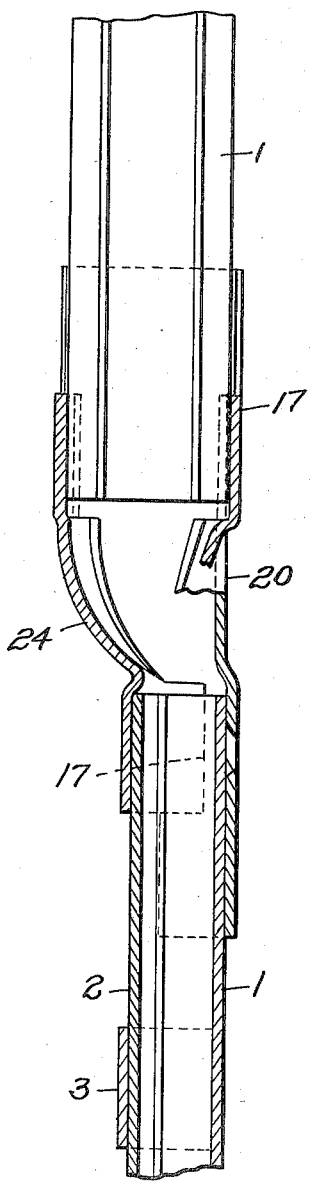

UNITED STATES PATENT OFFICE.

HOMER G. KNODERER, OF EDGEWORTH, AND CECIL R. HUBBARD, OF BADEN, PENNSYLVANIA, ASSIGNORS TO NATIONAL METAL MOLDING COMPANY, OF PITTSBURGH, PENNSYLVANIA, A CORPORATION OF PENNSYLVANIA.

ELECTRICAL-CONDUIT INSTALLATION.

1,302,811.   Specification of Letters Patent.   Patented May 6, 1919.

Application filed October 3, 1917. Serial No. 194,605.

*To all whom it may concern:*

Be it known that we, HOMER G. KNODERER, a citizen of the United States, residing at Edgeworth, county of Allegheny, State of Pennsylvania, and CECIL R. HUBBARD, a subject of the King of Great Britain, residing at Baden, in the county of Beaver and State of Pennsylvania, have invented or discovered certain new and useful Improvements in Electrical-Conduit Installations, of which improvements the following is a specification.

Our invention relates to improvements in installation of electrical conductor conduits of the kind generally known as molding.

While in its broader aspects the invention is not limited to molding of any particular material it is especially applicable to metal molding or thin walled raceways, which are attached to the surface of walls or other supports. There are in general two types of metal moldings, those formed of a single piece of metal and which are usually substantially elliptical, and those formed in two parts, a base and a cap, suitably held together, and our invention contemplates both such types.

The object of our invention is to provide a fitting for connecting and rendering continuous two molding conduits which extend parallel to each other but which lie in planes at right angles to each other.

Figure 1 is a combined sectional view of the base of a junction box and one of the conductor conduits attached thereto, and plan view of the other conductor conduit; Fig. 2 a perspective view of the base portion of the box; Fig. 3 a similar view of the box cap; Fig. 4 a sectional view of the assembled box, the plane of view being indicated by the line IV—IV, Fig. 1; Fig. 5 a view similar to Fig. 1 of the conduits connected with a different type of fitting; Figs. 6 and 7 perspective views of, respectively, the base and cap of the fitting; and Figs. 8 and 9 end views, respectively, of the base and cap of Figs. 6 and 7.

While as already stated various forms of molding may be used, that shown herein is metal molding comprising a semi-elliptical base 1 and a cover 2 adapted to close the open side of the base and to be held to the base by means of spring clips 3.

Two forms of fitting are shown herein, one a junction box in which the electrical conductors may be spliced or otherwise connected to each other, and the other a fitting which may be used for a continuous run of conductors.

Having reference first to the junction box fitting shown in Figs. 1 to 4, inclusive, it will be observed first that the two conduits 1, 2 extend parallel to each other, but lie in planes at right angles to each other, the open faces of their bases 1 being accessible for the purpose of placing electrical conductors in such bases. The junction box for connecting and rendering continuous these two conduits preferably comprises a base 4 and a cap 5 of the forms clearly shown in perspective in Figs. 2 and 3, respectively. The base has two bottoms 6 and 7 arranged at right angles to each other, adjacent to the two walls or supports 21 and 22, and is provided with oppositely disposed side walls 8 and 9. These side walls are provided with openings 10 and 11, the opening 10 being adjacent to the bottom 6 and the opening 11 to the bottom 7. It is at these openings that the conduits are connected to the base 4 of the box.

While various means may be provided for connecting conduits to the box, we preferably provide a two-part connector consisting of a base 12 and a cap 13. The base is provided at one end with a pair of yielding arms or spring clips 14 adapted to engage the conduit base 1 and at its other end with outwardly curved strips 16 adapted to engage the inner face of the side walls of the box. The cap 13 is provided with a pair of oppositely disposed spring arms 17 adapted also to engage the conduit 1 at a point between the arms 14 and the side of the box, and such cap is further provided with a groove 18 for engagement by the side wall of the cover 5. This specific form of conduit connector forms no part of my present invention, and is more fully illustrated and described in the patent application of William C. Robinson and Homer G. Knoderer, Serial No. 168,171, filed May 12, 1917.

After the conduits have been connected to a base in the manner described, the cover 5 is applied to the box, the outer walls of the cover telescoping with the outer faces of the side walls of the base. The cover may then be secured to the base by means of suitable screws 23 inserted through holes 19.

The fitting of Figs. 5 to 8, inclusive, is, as already stated, particularly adapted to connect two conduits in the manner already explained, and wherein it is desirable to maintain a continuous run of electrical conductors. The fitting comprises a base illustrated in Figs. 6 and 8, and a cap shown particularly in Figs. 7 and 9. The base is provided with a bottom 20 which is twisted so that one end thereof lies in a plane at right angles to that of the other end. Each end of the base is provided with pairs of spring clips 14 adapted to receive and engage the conduit bases 1.

The cap of Figs. 7 and 9 comprises a main body portion 24 which is also so twisted that its opposite end portions lie in planes at right angles to each other, and such ends are provided with pairs of spring clips 17 adapted to engage the conductors at points nearer the ends of the conduits than the point of engagement of the clips 14 of the fitting base. It will be understood of this fitting that the cap is held to the base indirectly through the engagement of both cap and base with the conduits.

The fittings which we have provided find ready use when it is desired to change the plane of a run of conduit without changing its general direction, as for example, the shifting of conduits from a ceiling to a wall or from one wall to another.

According to the provisions of the patent statutes we have described the principle and operation of our invention, together with constructions which we now consider to represent the best embodiment thereof. However, we desire to have it understood that, within the scope of the appended claims, our invention may be practised with other forms of construction than those particularly described herein.

We claim as our invention:

1. In an installation of electrical conductor conduits, the combination with two molding electrical conductor conduits extending parallel to each other and secured one to one support and the other to another support which supports have their faces at right angles to each other, of a connecting fitting comprising a base portion provided with openings for said conduits, and a cap for closing said base.

2. In an installation of electrical conductor conduits having open side members, the combination with a pair of conduits extending parallel to each other and having their open sides lying in planes at right angles to each other, of a connecting fitting comprising a base portion provided with openings for said conduits, and a cap for closing said base.

3. In an installation of electrical conductor conduits having open side members, the combination with a pair of conduits extending parallel to each other and having their open sides lying in planes at right angles to each other, of a connecting fitting comprising a base portion having oppositely disposed side walls provided with openings therethrough, means for attaching each of said conduits to said base at said openings, and a cap telescoping with the outer walls of said base and secured thereto.

In testimony whereof we have hereunto set our hands.

HOMER G. KNODERER.
CECIL R. HUBBARD.

Witness:
FRANCIS J. TOMASSON.